(12) United States Patent
Griffin

(10) Patent No.: US 6,208,737 B1
(45) Date of Patent: Mar. 27, 2001

(54) METHOD AND APPARATUS FOR TELEVISION SIGNAL SCRAMBLING USING THE REPLACEMENT OF SYNCHRONIZING AND COLOR SUBCARRIER SIGNALS WITH AN ALTERNATIVE TIME BASE INHERENT IN A QPSK AUDIO SUBCARRIER

(75) Inventor: John T. Griffin, Doylestown, PA (US)

(73) Assignee: General Instruments Corporation, Horsham, PA (US)

(*) Notice: Subject to any disclaimer, the term of this patent is extended or adjusted under 35 U.S.C. 154(b) by 0 days.

(21) Appl. No.: 09/110,864

(22) Filed: Jul. 7, 1998

(51) Int. Cl.[7] ................................................. H04N 7/16
(52) U.S. Cl. ..................... 380/221; 380/210; 380/274; 380/205
(58) Field of Search ................................. 380/205, 206, 380/210, 221, 287, 236, 274

(56) References Cited

U.S. PATENT DOCUMENTS

| | | | |
|---|---|---|---|
| 4,336,553 | * 6/1982 | Den Toonder et al. | 358/120 |
| 5,161,188 | * 11/1992 | Pires | 380/15 |
| 5,617,475 | * 4/1997 | Marz | 380/14 |
| 5,844,988 | * 12/1998 | Ryan et al. | 380/11 |

\* cited by examiner

*Primary Examiner*—Thomas R. Peeso
*Assistant Examiner*—Todd Jack
(74) *Attorney, Agent, or Firm*—Ronald P. Kananen; Rader, Fishman & Grauer

(57) ABSTRACT

A novel method and apparatus for scrambling a television signal includes using a synchronization separator to separate a synchronization signal from an input audio-visual signal. The synchronization signal is then used to regulate an oscillator producing an audio carrier signal. In this manner, the audio-visual signal is transmitted without the component synchronization signal rendering it useless to a conventional television receiver. The descrambler and descrambling method of the invention involve removing the audio carrier signal from the scrambled signal and using the audio carrier signal to generate the color sub-carrier signal and a vertical time frame reference signal necessary to synchronize the transmitted audio visual signal for display.

14 Claims, 4 Drawing Sheets

METHOD AND APPARATUS FOR TELEVISION SIGNAL SCRAMBLING USING THE REPLACEMENT OF SYNCHRONIZING AND COLOR SUBCARRIER SIGNALS WITH AN ALTERNATIVE TIME BASE INHERENT IN A QPSK AUDIO SUBCARRIER

FIELD OF THE INVENTION

The present invention relates to the field of audio-visual signal transmission and reception. More particularly, the present invention relates to a method and apparatus for scrambling an audio-visual signal during transmission in order to control reception and use of the signal.

BACKGROUND OF THE INVENTION

Cable and pay-per-view television programming are extremely popular and widely available in modern society. Those firms providing such programming are frequently lucrative and successful. This success comes from the ability to prevent those who have not purchased the service from receiving and using the audio-visual signals transmitted by the service provider.

In general, it is common for a cable company or other service provider to scramble its signals to prevent their use by unauthorized parties. This scrambling is intended to make the signals unintelligible to typical television sets which are not authorized to receive and use the scrambled signal. When the signal is scrambled, a conventional television will not recognize the signal, or at best, display a distorted image from the signal.

Cable companies which provide a number of channels over a cable connection may only scramble certain channels so that cable subscribers can be required to pay additional fees for receiving these "premium" channels. The premium channels are typically movie or adult channels.

Those subscribers who have paid the service provider for reception of the scrambled signal will be given equipment for use with their television sets which unscrambles the signal. With this equipment, the authorized user can unscramble and receive the service provider's signals and view the programming contained in the transmission.

A well-known conventional method of scrambling a signal to prevent its unauthorized reception is to reverse the spectral positions of the audio and video portions of the signal. Typically, an audio-visual signal will have an audio carrier signal at a first frequency and a video carrier signal at a second frequency. The carrier signals are modulated to carry the respective video and audio data of the transmitted programming.

If, however, the audio carrier signal is transmitted at the second (video carrier) frequency, and the video carrier signal is transmitted at the first (audio carrier) frequency, the signal is scrambled. A television tuner will be attempting to receive the audio signal at the first frequency and the video signal at the second frequency, and will be unable to receive the reversed signal properly.

Many other methods of scrambling audio-visual signals during transmission are known in the art. However, all are subject to various deficiencies. For example, many scrambling methods are only partially effective. Thus, while the scrambled signal is not received clearly, the image and audio may still be intelligible.

Accordingly, there is a need in the art for an improved and more effective means and method of scrambling an audio-visual signal.

SUMMARY OF THE INVENTION

It is an object of the present invention to meet the above-described needs and others. Specifically, it is an object of the present invention to provide a method and apparatus for scrambling an audio-visual signal and for receiving and unscrambling the scrambled signal that is highly effective.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied as a method of transmitting a scrambled electronic audio-visual signal by generating a digital audio signal component of the audio-visual signal having a time base which is common to a synchronization signal of a video signal component of the audio-visual signal and a color sub-carrier signal of the video signal. Prior to generating this audio signal, the method of the present invention includes removing the synchronization signal from the video signal. The color sub-carrier signal is also preferably removed prior to broadcast of the scrambled audio-visual signal.

In conjunction with the creation of the common time base of the audio signal, the method of the present invention includes inserting a fixed digital message into a vertical interval of the video signal which is used to reintegrate the synchronization signal with the video signal.

When the scrambled audio-visual signal is received, the method of the present invention includes reconstructing the synchronization signal and the color sub-carrier signal from the common time base of the audio signal. Specifically, the steps of this inventive method may be broadcasting the video signal and the audio signal in composite; receiving the composite signal; obtaining the common time base from the audio signal; and reconstructing the color sub-carrier and the synchronization signal from the common time base.

Following reconstruction of the signal components necessary to properly display the audio visual signal, the method includes reintegrating the reconstructed synchronization signal and the reconstructed color sub-carrier signal with a video signal component of the received composite signal.

The present invention also encompasses the circuitry necessary to apply the foregoing method. Specifically, the present invention encompasses an audio-visual signal scrambler having: a synchronization separator for receiving a clear video signal and removing therefrom a synchronization signal; and an oscillator and phase locked loop circuit for receiving the synchronization signal and using the synchronization signal to generate a time base common to the synchronization signal, a color sub-carrier signal and an audio signal of the audiovisual signal.

The scrambler of the present invention also includes an audio encoder for generating the audio signal by encoding input audio signals to an audio carrier signal having the common time base; and a video encoder for inserting a fixed digital message into a vertical interval of the video signal which is used to reintegrate the synchronization signal with the video signal.

The oscillator and phase locked loop circuit includes a first reference oscillator regulated by the synchronization signal; a second reference oscillator; and a phase comparator for comparing signals from the first and second reference oscillators. The second reference oscillator is regulated by a signal output by the phase comparator and low pass filtered through a low pass filter.

A first divider circuit is provided for dividing the output of the first oscillator to generate a reference signal on which the fixed message is based; and a second divider circuit is provided for dividing the output of the first oscillator before the output of the first oscillator is input to the phase comparator.

The present invention also encompasses a descrambler for descrambling a scrambled audio-visual signal. Such a descrambler includes a tuner for receiving the scrambled audio-visual signal; a QPSK demodulator for removing a common time base from an audio carrier signal of the audio-visual signal; a clock and timing recovery circuit for receiving the common time base and generating therefrom a vertical time frame reference signal and a color sub-carrier signal phase locked to the audio carrier signal; and a video decoder connected to a synchronization and color burst reconstruction circuit for unscrambling a video signal component of the audiovisual signal using the color sub-carrier signal and the vertical time frame reference signal.

Preferably, the descrambler of the present invention also includes a video demodulator connected between the tuner and the video decoder; and an audio decoder for decoding an audio component of the audio-visual signal.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Under the principles of the present invention, a composite television signal is modified to inhibit clear and stable reception by unauthorized standard television receivers or decoders. All horizontal and vertical synchronizing portions of the composite signal, and all the color sub-carrier bursts are replaced with a nonstandard signal format. This nonstandard portion of the signal format may be a constant luminance level, or may be some form of in-band auxiliary data.

Also, the standard FM audio sub-carrier is replaced with a digital QPSK (quadrature phase shift keyed) audio sub-carrier. In order to convey a time reference for horizontal and vertical line position, a digital frame rate bit pattern is inserted in one line of the vertical interval.

At the encoder, the composite video time base and the digital audio QPSK sub-carrier time base are derived from a single clock source with a frequency $F_S$. The composite video time base and the digital audio QPSK sub-carrier time base include vertical and horizontal synchronizing information, the color sub-carrier frequency, and all timing information required for the digital QPSK audio transmission.

The reference frequency $F_S$ is N times the color sub-carrier and is also directly related to the time base for the digital audio sub-carrier encoder and decoder. The digital audio clock source crystal oscillator produces a frequency $F_A$ which is locked to the frequency $F_S$ through a phase-locked loop. The signal $F_S$ is divided by M and is compared to $F_A$ divided by P. In this way, the common time base is inherent in the digital audio QPSK sub-carrier. All timing for the digital audio sub-carrier system is derived from the clock signal $F_A$, which is locked to $F_S$.

At the decoder, the frequency $F_A$ is recovered from the received QPSK signal. A clock signal with a frequency $F_1$ is derived from $F_A$ by dividing by P. The time base clock signal of frequency $F_S$ is recovered using $F_1$ by means of a phase locked loop. The color sub-carrier is derived from $F_S$ by dividing by N. The fixed reference pattern in the vertical interval is decoded in order to facilitate reconstruction of all video synchronizing pulses and color sub-carrier bursts.

Using the drawings, the preferred embodiments of the present invention will now be explained.

Figure 1:
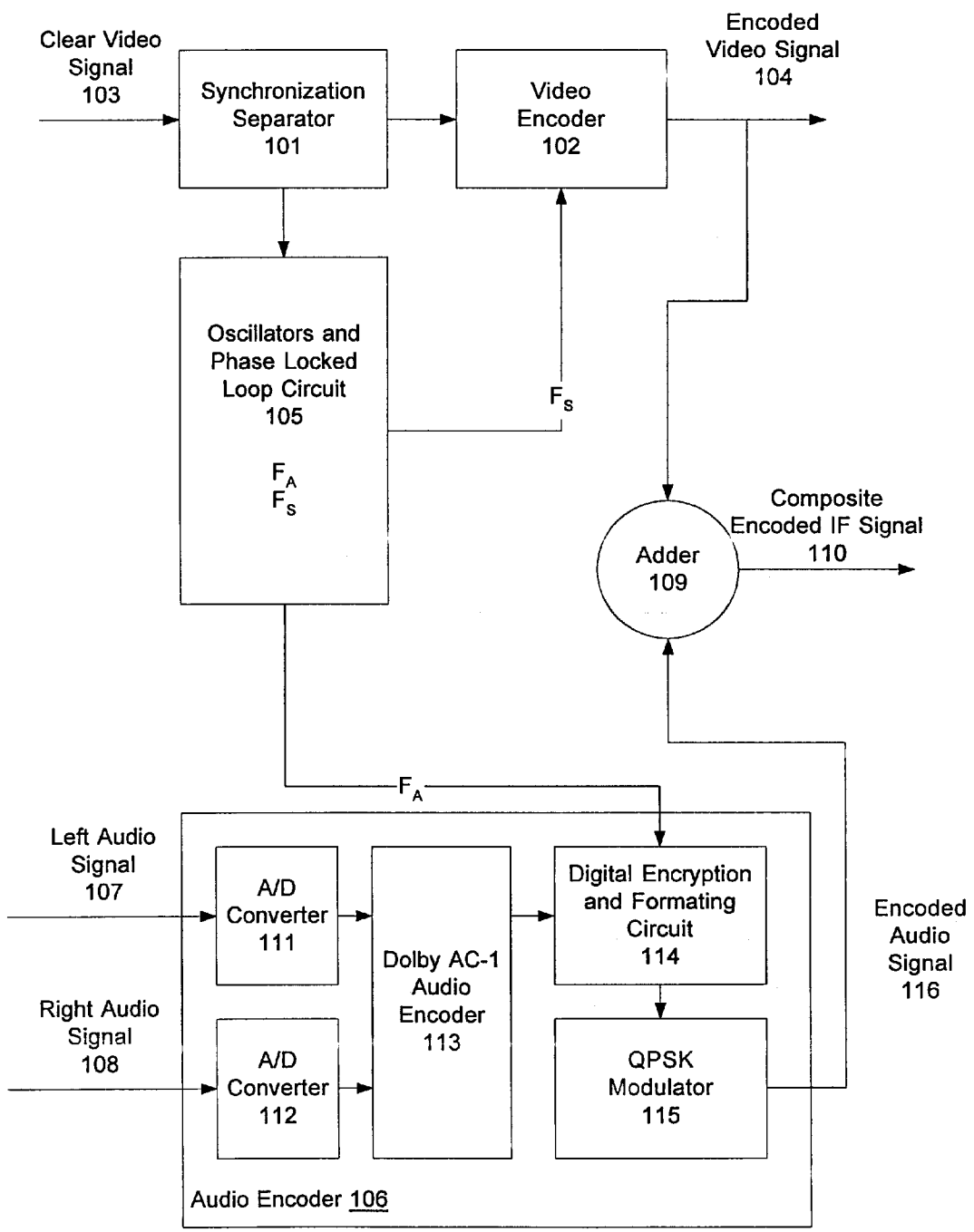
FIG. 1 is block diagram showing a signal encoder for scrambling an audio-visual signal according to the principles of the present invention.

FIG. 1 illustrates an encoder for scrambling a television signal according to the principles of the present invention. A clear, unscrambled video signal 103 and left and right audio signals 107 and 108 are input to the encoder. The video signal 103 is processed by a synchronization separator circuit 101 which removes a synchronization component from the signal which provides all the synchronization information necessary for a television receiver to utilize the signal. The video signal, stripped of the synchronization signal, is then provided to a video encoder 102.

The synchronization signal removed from the video signal 101 is provided to a circuit 105 which includes reference oscillators and a phase locked loop circuit. Using the signal from the synchronization separator 101, this circuit 105 provides a reference signal with frequency $F_S$ to the video encoder 102.

The encoder 102 encodes the video signal by removing the color sub-carrier signal. The encoder 102 also uses the reference signal $F_S$ to insert a fixed digital message (a serial bit pattern of 24 to 30 bits) into the vertical interval of the video signal. This fixed digital message establishes a known point in time in the video frame which can be used to restore the video synchronization information to the video signal following reconstruction of the synchronization information by a decoder receiving the broadcast of the scrambled television signal. The encoder 102 then outputs an encoded video signal 104.

The oscillator and phase locked loop circuit 105 also outputs a second reference signal with frequency $F_A$. The signal $F_A$ is provided to an audio encoder 106. The audio encoder 106 also receives the left and right audio signals 107, 108 and uses the signal $F_A$ to synchronize the time base of the audio bit stream with a reference oscillator 301 (FIG. 3) which is synchronized with the synchronization signal from the separator 101.

As shown in FIG. 1, the audio encoder 106 includes a pair of analog-to-digital (A/D) converters 111 and 112 which respectively receive the left and right audio signals 107 and 108. After conversion to a digital signal format, the left and right audio signals 107 and 108 are output respectively by the A/D converters 111 and 112 to a Dolby AC-1 audio encoder 113.

The output of the audio encoder 113 is input to a digital encryption and formatting circuit 114. The encryption and formatting circuit 114 also receives the signal $F_A$ as the audio sub-carrier signal from the oscillators and phase locked loop circuit 105, and encodes the audio data to the new sub-carrier signal $F_A$.

The output from the digital encryption and formatting circuit 114 is then provided to a QPSK modulator 115 which replaces the standard FM audio sub-carrier with a digital QPSK audio sub-carrier. The modulator 115 then outputs an encoded audio signal 116 with a QPSK audio sub-carrier based on $F_A$. Consequently, the time base of the encoded QPSK audio signal is common to the synchronization signal output by the separator 101 and to the color sub-carrier signal.

The encoded audio signal 116 is sent from the audio encoder 106 to an adder 109. The encoded video signal 104 is also provided to the adder 109. The adder 109 then generates a composite encoded signal 110 for transmission. The signal 110 is an intermediate frequency (IF) signal which is subsequently converted to a radio frequency (RF) signal for broadcasting.

In its encoded form, unauthorized television receivers will be unable to make use of the broadcast signal 204. The signal does not contain the standard audio carrier frequency or the standard color sub-carrier frequency. Moreover, no synchronization data necessary for an unaided television receiver to intelligibly display the images carried by the signal is provided. Rather, the color sub-carrier, the composite synchronization signal and the time base of the QPSK audio signal are all synchronized with the reference oscillator 301 of the oscillator and phase locked loop circuit 105. This common time base provided by the reference oscillator 301 is later extracted from the QPSK sub-carrier and used to reconstruct the information necessary to properly decode and display the composite television signal.

Figure 2:
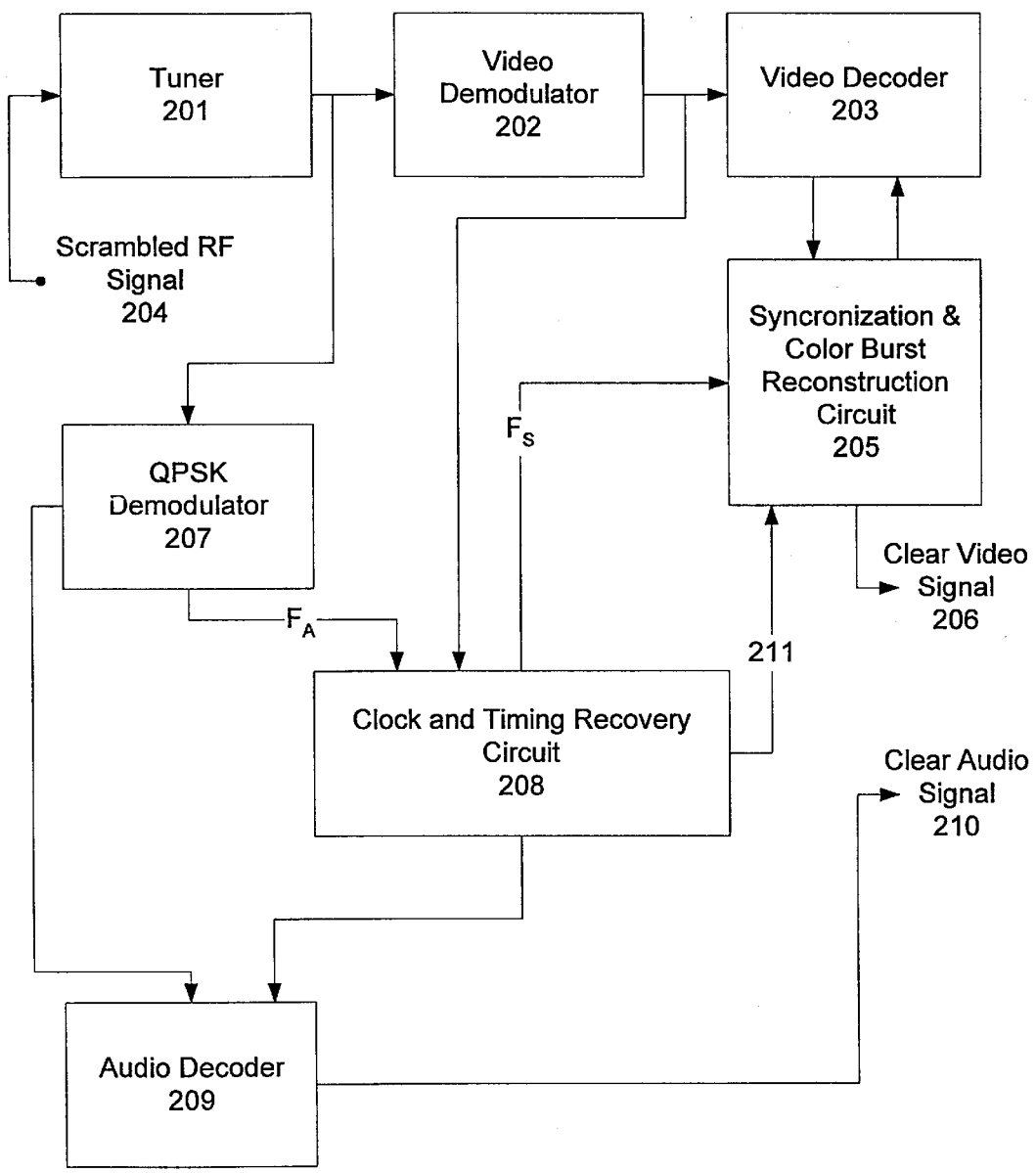
FIG. 2 is a block diagram showing a signal decoder for unscrambling an audio-visual signal according to the principles of the present invention.

FIG. 2 illustrates a decoder according to the principles of the present invention for decoding a broadcast television signal encoded by the encoder of FIG. 1. The scrambled RF signal 204 is received by a tuner 201 of a television receiver which is tuned to received the encoded signal 204.

The tuner 201 provides the encoded signal to a video demodulator 202 and a QPSK demodulator 207. The QPSK demodulator 207 recovers the common time base to which the composite sync signal, color sub-carrier and digital audio bit stream are all synchronized. This common time base gives rise to the reference signal $F_A$. Then the QPSK demodulator 207 provides the audio portion of the signal to an audio decoder 209 and the reference signal $F_A$ to a clock and timing recovery circuit 208.

Using the reference signal $F_A$ from the QPSK demodulator 207 and the output of the video demodulator 202, the clock and timing recovery circuit reconstructs the synchronization information needed to accurately display the scrambled television signal. Specifically, the clock timing and recovery circuit 208 provides an audio recovery signal to the audio decoder 209 which directs the audio decoder 209 to the proper audio carrier signal frequency so that the decoder 209 can decode the audio signal provided by the QPSK demodulator 207 and provide a clear audio signal 210 for use by a television receiver.

The clock timing and recovery circuit 208 also reconstructs reference signal $F_S$ and a vertical time (frame) reference signal. These two signals are provided to the synchronization and color burst reconstruction circuit 205. The circuit 205 exchanges data with the video decoder 203 to generate a clear video signal 206 which can be accurately displayed by a television receiver.

Figure 3:
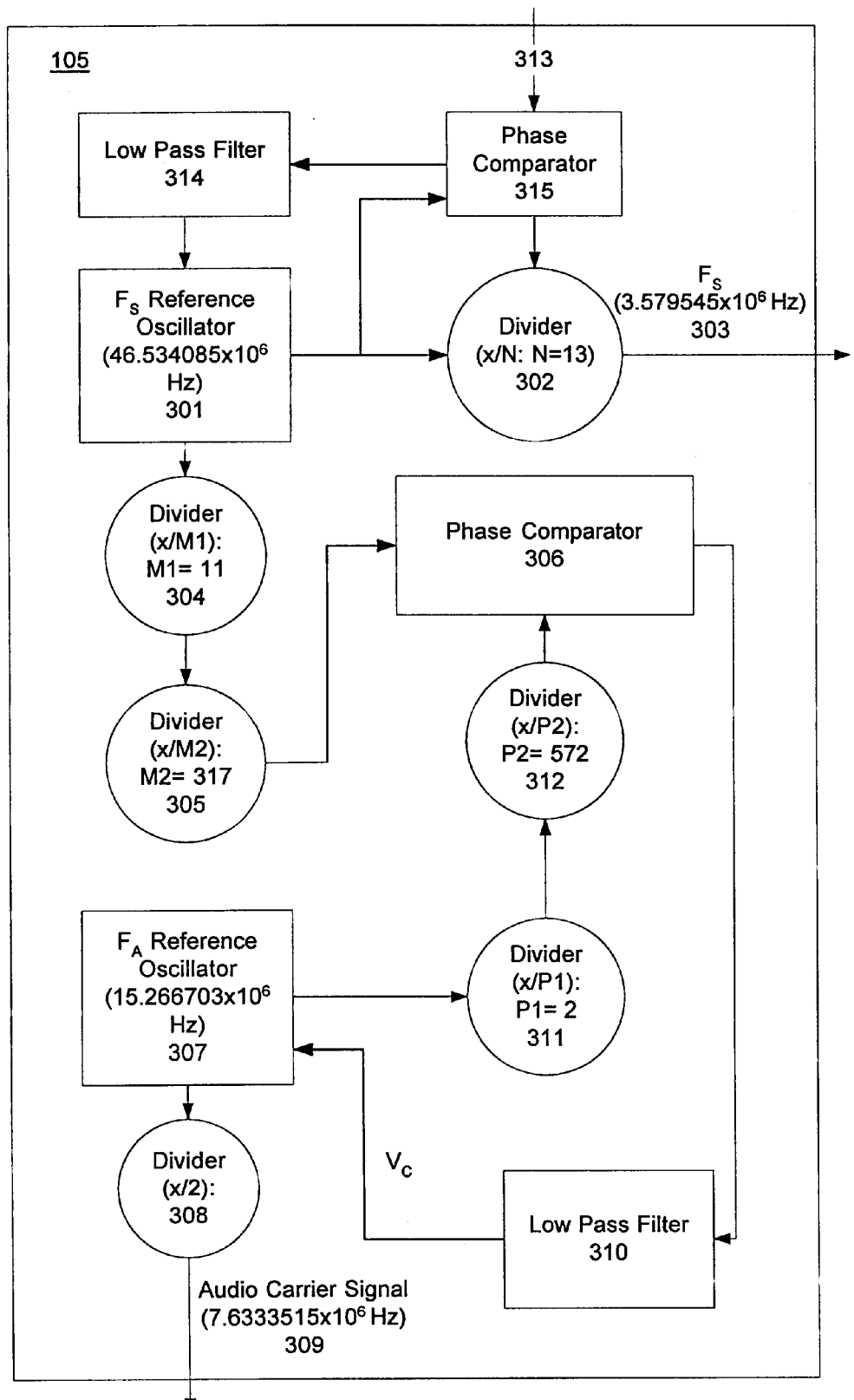
FIG. 3 is a block diagram illustrating the oscillators and phase locked loop circuit of FIG. 1.

FIG. 3 details the oscillators and phase locked loop circuit 105 of FIG. 1. As shown in FIG. 3, the signal 313 from the synchronization separator 101 is provided to a phase comparator 315. The phase comparator 315 compares the phase of the signal 313 with the phase of a reference signal from a reference oscillator 301. In the specific example illustrated in FIG. 3, the reference oscillator 301 produces a signal at $46.534085 \times 10^6$ Hz.

The results of the comparison are output through a low pass filter 314 to the reference oscillator 301 to lock the phase of the reference oscillator to the phase of the signal 313 from the synchronization separator. The reference signal from the reference oscillator 301 is then provided to a divider 302 which divides the reference signal by a divisor N. In the illustrated example, the divider 302 divides the signal by 13 to produce a signal 303 at $3.579545 \times 10^6$ Hz. This signal is the reference signal $F_S$ and is by the encoder 102 to mark the video signal with a known point in time so that the synchronization information removed by the separator 101 can be reintegrated properly to with the video-signal by the decoder 203 and reconstruction circuit 205.

The reference signal from the oscillator 301 is also provided to another divider which divides the frequency by a divisor of M. In the specific example illustrated, M=3487 and the division is accomplished by a series of two dividers, a first divider 304 dividing by M1, where M1=11, and a second divider 305 dividing by M2, where M2=317 (11× 317=3487). The resulting reference signal has frequency F1, in the example 13.3450201 MHz. The F1 signal is provided to a phase comparator 306 of a phase locked loop.

A second reference oscillator 307 in circuit 105 provides a reference signal which, in the illustrated example, has a frequency of $15.266703 \times 10^6$ Hz. This signal is the basis for the reference signal with frequency $F_A$ described above.

The output of the oscillator 307 is divided by P. In the illustrated example, P=1144 and the division is accomplished by a series of two dividers. A first divider 312 divides the reference signal from oscillator 307 by P1, where P1=2, and a second divider 312 divides the resulting signal by P2, where P2=572 (2×572=1144). The resulting signal again has frequency F1, which in the example is 13.3450201 MHz. The F1 signal from divider 312 is also provided to the phase comparator 306.

The phase comparator 306 compares the F1 signals provided respectively from dividers 305 and 312 and outputs a signal representing the result of the comparison to a low pass filter 310. The low pass filter filters the signal and provides a resulting signal $V_c$ to the reference oscillator 307 to regulate the oscillator 307, thereby completing the phase locked loop.

The reference signal output by oscillator 307 is also provided to a divider 308 which, in the illustrated example, divides the signal by 2. The resulting signal is the reference signal with frequency $F_A$ and is output to the audio encoder 106 as a digital audio QPSK carrier signal. In the illustrated example, $F_A = 7.6333515 \times 10^6$ Hz.

Consequently, a common time base between the audio and color sub-carriers is inherent in the reference signal $F_A$ which is locked to the reference signal $F_S$. All the timing for the digital audio sub-carrier system is derived from the reference signal $F_A$.

Because the oscillator 301 is regulated by the synchronization signal separated from the clear video signal 103 by the separator 101, and because the phase of oscillator 307 is locked to that of oscillator 301, the output of oscillator 307, reference signal $F_A$ used as the audio carrier signal, can be used by the decoder of FIG. 2 to reconstruct the synchronization data and color sub-carrier signal necessary to properly display the encoded video signal 104.

Figure 4:
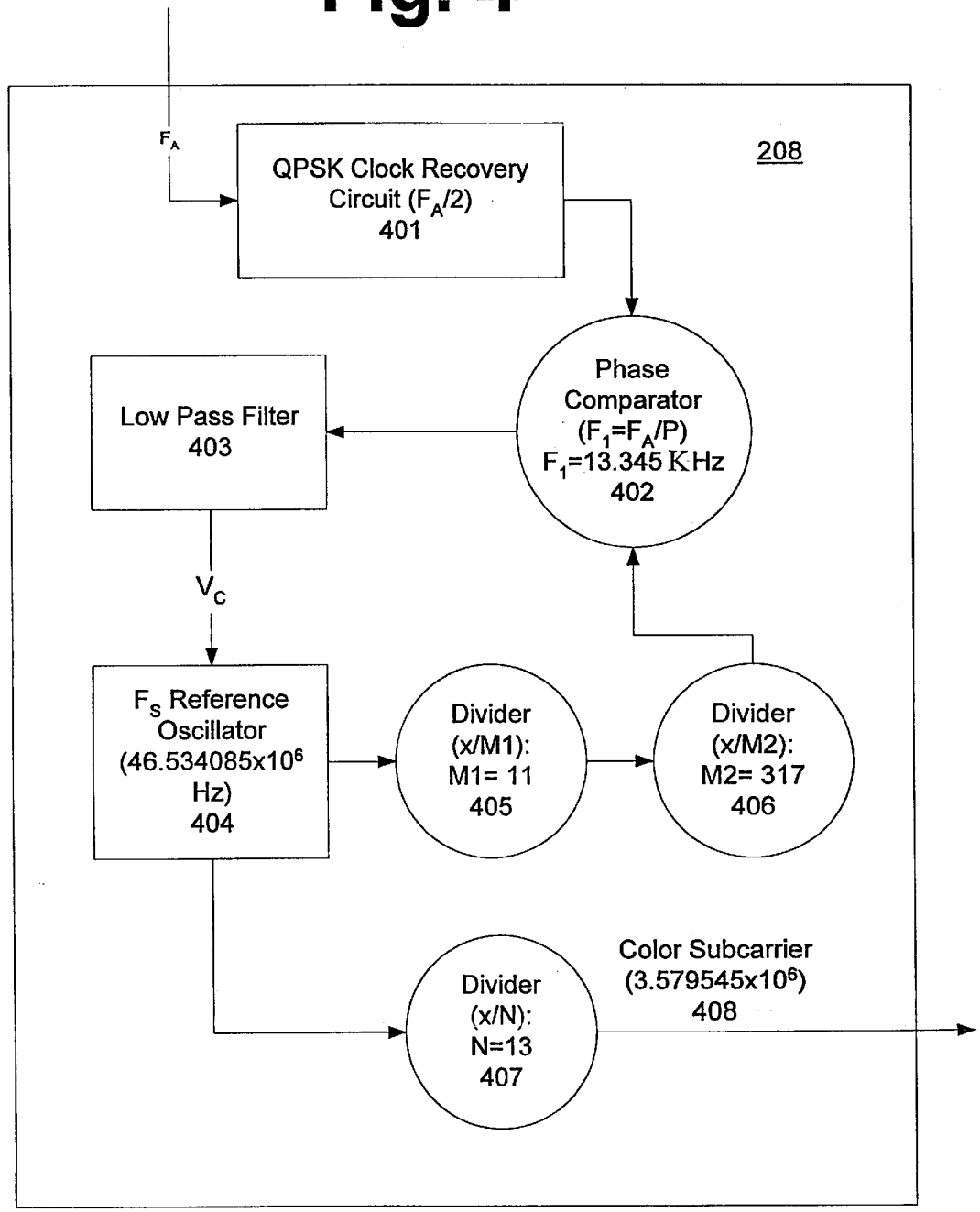
FIG. 4 is a block diagram illustrating a portion of the decoder of FIG. 2.

FIG. 4 illustrates the details of the clock and timing recovery circuit 208 of FIG. 2. As shown in FIG. 2, the QPSK demodulator 207 recovers the audio carrier signal $F_A$ from the scrambled signal 204 and provides that signal to the clock and timing recovery circuit 208. Within the clock and timing recovery circuit 208, the signal $F_A$ from the QPSK demodulator 207 is provided to a QPSK clock recovery circuit 401, which divides the signal with frequency $F_A$ by 2 to generate a reference signal with frequency F1. The F1 signal is input to a phase comparator 402.

A reference oscillator 404 identical to the oscillator 301 in FIG. 3 is also provided within in the circuit 208. The oscillator 404 outputs a reference signal which, in the illustrated example is again $46.534085 \times 10^6$ Hz. The output of oscillator 404 is divided by divider 407. In the illustrated example, divider 407 divides the frequency of the reference signal from oscillator 404 by N, where N=13. The resulting signal 408 is the color sub-carrier signal with frequency $F_S$, e.g. $3.579545 \times 10^6$ Hz, which is provided to the synchronization and color burst reconstruction circuit 205 for descrambling the video signal.

To accurately generate the reference signal $F_S$, the output from the reference oscillator 404 is also provided through a series of two dividers to the phase comparator 402. The two dividers divide the signal frequency by M. In the illustrated example, M=3487, and the division is accomplished by the first divider 304 dividing by M1, where M1=11, and a second divider 305 dividing by M2, where M2=317 (11× 317=3487). The resulting reference signal has frequency F1, in the example 13.3450201 KHz. The F1 signal from divider 406 is provided to the phase comparator 402.

The comparator 402 compares the F1 signal from divider 406 with the F1 signal from circuit 401. The signal resulting from the comparison is low pass filtered by filter 403. The result $V_C$ is used to regulate the oscillator 404, locking the generated color sub-carrier of frequency $F_S$ to the $F_A$ signal recovered by the QPSK demodulator 207.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method of transmitting a scrambled electronic audio-visual signal comprising generating a digital audio signal component of said audio-visual signal having a time base which is common to a synchronization signal of a video signal component of said audio-visual signal and a color sub-carrier signal of said video signal.

2. A method as claimed in claim 1 further comprising, prior to said generating, removing said synchronization signal from said video signal.

3. A method as claimed in claim 2, further comprising inserting a fixed digital message into a vertical interval of said video signal which is used to reintegrate said synchronization signal with said video signal.

4. A method as claimed in claim 1, further comprising removing said color sub-carrier signal from said video signal prior to broadcasting said video signal.

5. A method as claimed in claim 1, further comprising reconstructing said synchronization signal and said color sub-carrier signal from said common time base of said audio signal after broadcast of said audio-visual signal.

6. A method as claimed in claim 1, further comprising:
   broadcasting said video signal and said audio signal in composite;
   receiving said composite signal;
   obtaining said common time base from said audio signal; and
   reconstructing said color sub-carrier and said synchronization signal from said common time base.

7. A method as claimed in claim 6, further comprising, reintegrating said reconstructed synchronization signal and said reconstructed color sub-carrier signal with a video signal component of said received composite signal.

8. An audio-visual signal scrambler comprising:
   a synchronization separator for receiving a clear video signal and removing therefrom a synchronization signal; and
   an oscillator and phase locked loop circuit for receiving said synchronization signal and using said synchronization signal to generate a time base common to said synchronization signal, a color sub-carrier signal and an audio signal of said audio-visual signal.

9. A scrambler as claimed in claim 8, further comprising;
   an audio encoder for generating said audio signal by encoding input audio signals to an audio carrier signal having said common time base; and
   a video encoder for inserting a fixed digital message into a vertical interval of said video signal which is used to reintegrate said synchronization signal with said video signal.

10. A scrambler as claimed in claim 9, wherein said oscillator and phase locked loop circuit further comprises:
    a first reference oscillator regulated by said synchronization signal;
    a second reference oscillator; and
    a phase comparator for comparing signals from said first and second reference oscillators;
    wherein said second reference oscillator is regulated by a signal output by said phase comparator and low pass filtered through a low pass filter.

11. A scrambler as claimed in claim 10, further comprising:
    a first divider circuit for dividing the output of said first oscillator to generate a reference signal on which said fixed message is based; and
    a second divider circuit for dividing the output of said first oscillator before the output of said first oscillator is input to said phase comparator.

12. A descrambler for descrambling a scrambled audio-visual signal comprising:
    a tuner for receiving said scrambled audio-visual signal;
    a QPSK demodulator for removing a common time base from an audio carrier signal of said audio-visual signal;
    a clock and timing recovery circuit for receiving the common time base and generating therefrom a vertical time frame reference signal and a color sub-carrier signal phase locked to said audio carrier signal; and
    a video decoder connected to a synchronization and color burst reconstruction circuit for unscrambling a video signal component of said audio-visual signal using said color sub-carrier signal and said vertical time frame reference signal.

13. A descrambler as claimed in claim 12, further comprising, a video demodulator connected between said tuner and said video decoder.

14. A descrambler as claimed in claim 12, further comprising an audio decoder for decoding an audio component of said audio-visual signal.

* * * * *